May 29, 1962  CHIN SUNG KIM  3,036,619

SAFETY TUBE

Filed Jan. 23, 1958

INVENTOR.
CHIN SUNG KIM
BY
ATTORNEY

United States Patent Office 3,036,619
Patented May 29, 1962

3,036,619
SAFETY TUBE
Chin Sung Kim, Teakyo-Dong, Pusan, Korea
(Box 1219 Seoul International Post Office, Seoul, Korea)
Filed Jan. 23, 1958, Ser. No. 710,765
4 Claims. (Cl. 152—337)

This invention relates to an improved structure for tubes useful in the inflation of rubber tires for vehicles.

It is a common experience that when a tire puncture occurs, the entire tube and tire collapse, sometimes with disastrous results for the vehicle. Many forms of safety tube and safe tire exist, all designed to diminish the severity of the shock when loss of air in a tire occurs, but all suffer from the disadvantage that the whole tire and tube are involved. It is, accordingly, a basic object of this invention to minimize and virtually eliminate the overall damage which occurs when a tube is punctured, and alter the structure so that anyone may repair a punctured tube.

It is another object of the invention to provide a tube structure which is compartmentalized so that when a puncture occurs, at most, only a single compartment is lost and it can be replaced without grave difficulty even by an unskilled operator.

Further objects and advantages will in part be obvious and in part appear hereinafter.

The invention, accordingly, is involved in an improvement in the construction of rubber tubes for vehicles and is characterized by having the main body of the tube sub-divided into a plurality of separate air compartments, each of which is detachable from the tube and accordingly, may be replaced. In general, the tube consists of a plurality of separate air compartments each of which is detachable from the tube and accordingly, may be replaced. In general, the tube consists of a plurality of separate air compartments which are circularly arranged contiguous to each other, having the adjacent walls formed to abut against one another closely when the tube is inflated, the inner portion of the circumference of the tube being formed with a laminated fabric and rubber plate, which, further, on its inner side is backed by a foam rubber liner. This structure serves as the inflatable or inflating means through which air holes from the air compartments lead to the air filling spaces in which there is communication with a source of air, all of which is encased in foam rubber so that the said air holes open and close in accordance with the degree of expansion and contraction of the pipe.

Figure 1:
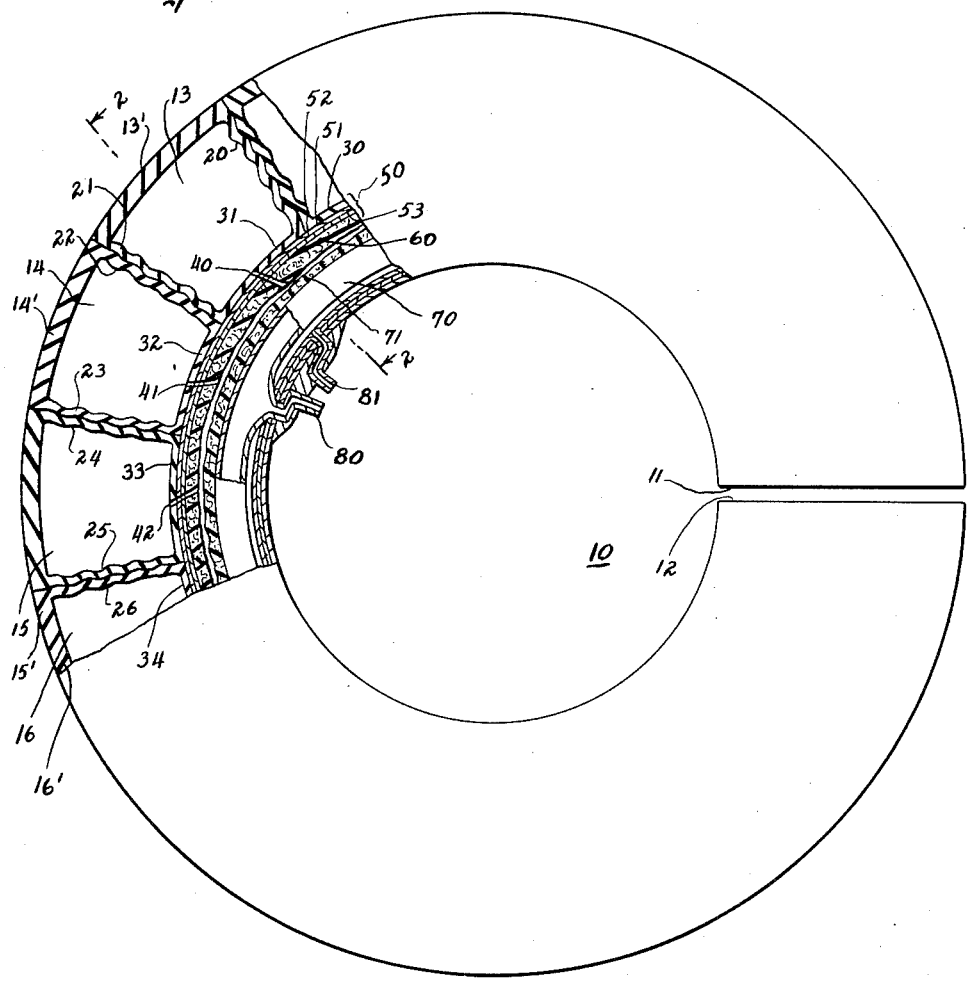
Figure 2:
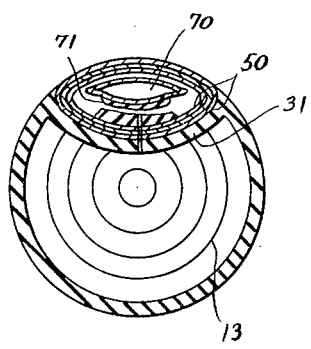

In the drawing, FIGURE 1 is a plan view of the tube made in accordance with the invention, shown partly in section to illustrate the arrangement of internal compartments; and FIGURE 2 is a section taken along the line 2—2 shown in FIGURE 1.

In the drawing 10 represents a tube body which is formed as a fundamental circular element having closed ends 11 and 12 which abut at substantially the point where the circle is completed. The tube itself has a major part of its volume formed from individual air cells 13, 14, 15, 16, etc. which are characterized by having outer surfaces 13', 14', 15', 16' formed to take the shape of the inside of a tire and to have the contour of a complete circle so that each such section is a portion of a circle. The individual side walls of the sections 20, 21, 22, 23, 24, 25, 26, are formed to be basically rippled or wavy so that the arcuate indentations in each of the side walls will mesh with those in the adjacent compartment when they are fully inflated.

The inner face 30, 31, 32, 33 and 34 of each of the compartments is provided with an air inlet 40, 41, 42, etc., and the face of the compartment itself is laminated with the laminated cloth, rubber plate 50 made up of rubber and cloth plies 51, 52, 53, and having the foam rubber facing 60 which forms the essential inner case for inflation of the separate cells.

The radial section through an individual cell illustrates its shape in FIGURE 2. There it will be seen that the cell 13 in radial section is fundamentally a substantial portion of an arc of a circle and that the bottom 31, for example, is concave to give the entire section the outline of a large crescent. The laminated plate 50 is an air retaining ring composed of layers of cloth and rubber and is fundamentally of elliptical cross-section and when fully inflated and against the concave portion of the tube cross-section, it completes the circular section.

Forming part of the assembly of the internal inflating ring or elasticity controller 70 is the foam rubber layer 71, directly opposed and matched with the foam rubber 60 forming one face of the cloth-rubber plate 50. Further details of the construction appear in FIGURE 1, where it will be seen that the elasticity controller 70 is an internal inflating ring which is inflated through valve 80. Air retaining ring 50 communicates with valve 81 and is inflated therethrough.

It will be seen thus that through valve 81 air is forced into the air retaining ring 50 which in turn communicates with the individual air compartments through the channels which are directed diagonally through the laminated inside wall and foam rubber layer.

Thus, when air is injected through the retaining ring 50 through the valve 81 it passes through the individual holes in the compartments and fills them to the degree of inflation desired. When the desired degree of inflation in this manner has been achieved the elasticity controller or internal ring 70 is inflated and the air holes from the individual compartments are compressed between the laminated foam rubber plates 71 and 60 to be closed thereby. The provision of the foam rubber cushion in this laminate adequately locks the air in the separate compartments.

Materials of construction may be any of the conventional ones used in fabricating tires. Rubber, synthetic rubber, rubber substitutes and mixtures of the natural rubber and synthetic products are useful in making the tire carcass.

As cloth laminates any of the accepted cotton, rayon, nylon fabrics will do. Also, they may be reinforced with wire. The cements useful in preparing the laminates also are any of the rubber and synthetic rubber cements used in the fabrication of tires.

It is to be understood, accordingly, that the invention is concerned with the mechanical arrangement of parts and modification of the tube and tire rather than with any change in the composition of materials used.

Valve structures and closures for inlets 80 and 81 are also of conventional types.

In use, when fully inflated this safety tube has the advantage that a tire puncture will hit only a single cell or, at a highly improbable worst, may simultaneously strike the dividing wall between two cells. The result, however, is merely the loss of inflation of the damaged cell and the tire remains serviceable on its remaining inflation. For repair, the tube is removed from the tire, the damaged section pulled or cut out and replaced with a new section.

The principal advantage ofthe tire is, of course, the safety feature involved in preserving most of the inflation of the tire despite a puncture received in a vehicle moving at high speed.

Though the invention has been described with reference to only a single example, it is to be understood that variations in details of construction may be adopted without departing from the spirit or scope of the invention.

What is claimed is:

1. An inflatable tube for use in pneumatic tires for vehicles, which tube comprises a plurality of air compartments juxtaposed circumferentially around a circle, each compartment being substantially less than semi-circular in circumferential extent, the said plurality of compartments being placed adjacent to each other as a series of cells of substantially the same size and shape to form a complete essentially torus shaped air container sub-divided into said separate compartments, an adjacent first flexible ring of a unitary form comprising a completely circular inner section, the said flexible ring being inflatable and further communicating with each of the individual cells of said outer container, a third flexible inflatable section comprising a ring within said first ring and having essentially the same cross-section, the said rings being separately inflatable, the first to contact and inflate said individual cells, and said second to contact and sever communication from said cells to said first ring, said first ring and second ring being laminated with foam layers, whereby upon inflation of said second ring, compression of said foam layers is induced and individual sealing of said cells is maintained.

2. The device in accordance with claim 1 in which said air compartments are individually formed of rubber and have their adjacent radial faces of a corrugated configuration.

3. The device in accordance with claim 2 in which the compartments are cemented to an inflating ring along their inner faces.

4. The device in accordance with claim 3 in which the inflating ring is essentially elliptical in cross-secton.

References Cited in the file of this patent

UNITED STATES PATENTS

| | | |
|---|---|---|
| 498,373 | Williams | May 30, 1893 |
| 551,471 | O'Neill et al. | Dec. 17, 1895 |
| 1,115,430 | Hoppes | Oct. 27, 1914 |
| 1,244,236 | Oberfelder | Oct. 23, 1917 |

FOREIGN PATENTS

| | | |
|---|---|---|
| 12,172 | Great Britain | of 1893 |
| 21,926 | Great Britain | of 1905 |